May 15, 1928.
C. C. EGBERT
1,669,700
PRESSURE RELIEF DEVICE
Filed May 4, 1923
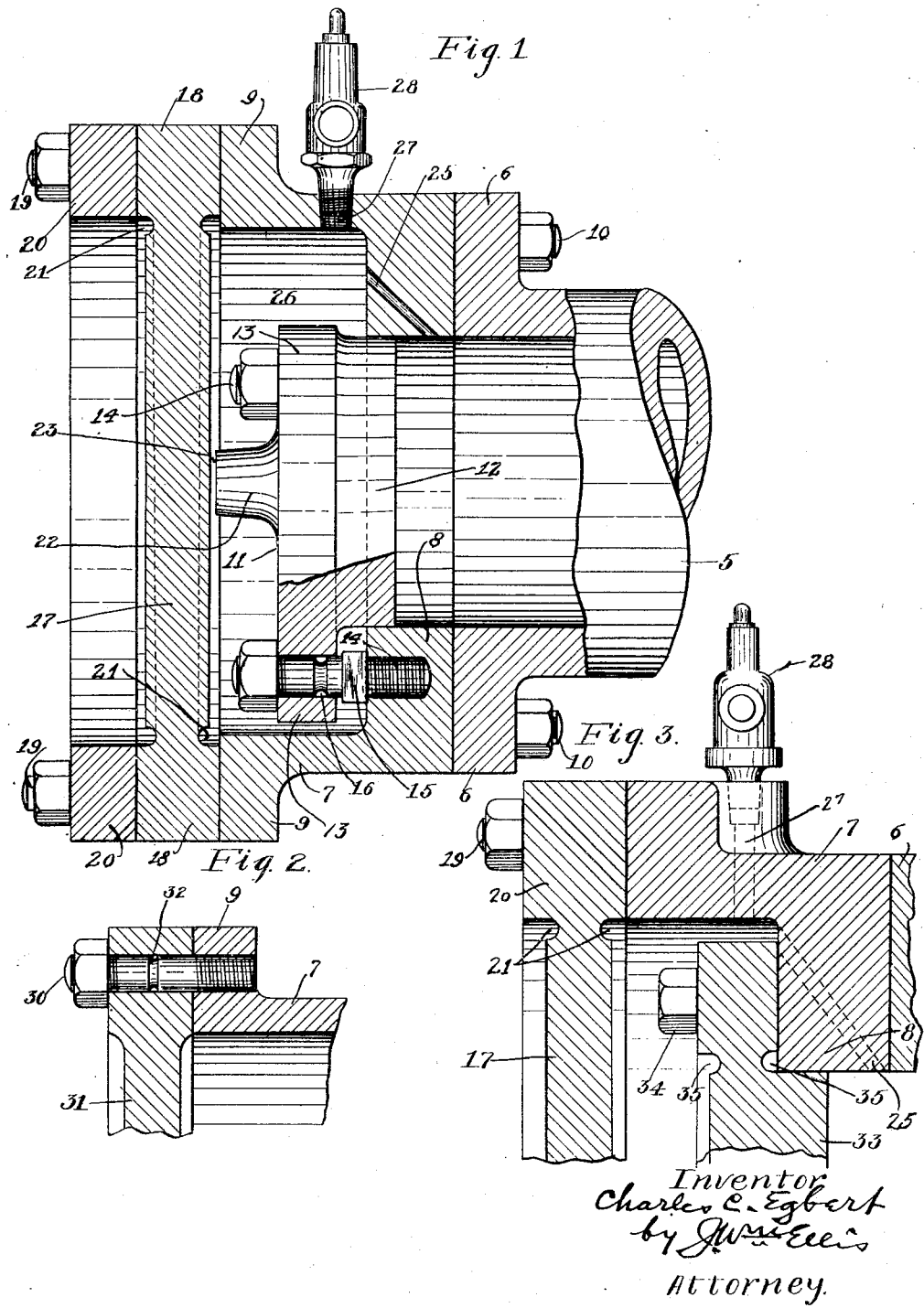
Inventor
Charles C. Egbert
by J. Wm. Ellis
Attorney.

Patented May 15, 1928.

UNITED STATES PATENT OFFICE.

CHARLES C. EGBERT, OF NIAGARA FALLS, NEW YORK.

PRESSURE-RELIEF DEVICE.

Application filed May 4, 1923. Serial No. 636,586.

My invention relates generally to safety devices, in the nature of bursting plates, used to relieve the pressure within any receptacle, and more particularly to a device for use in connection with penstocks supplying water for driving turbines.

It is well known to those skilled in the art, that prior to my invention of a pressure-relief device, for which I obtained Letters Patent of the United States of America, No. 1,394,072 on October 18, 1921, bursting plates used in pressure-relief devices had to be constructed with a very small factor of safety in order to be effective as a means of relieving pressure. The experience was that the pulsations in pressure which usually occur in a penstock following sudden variations in the quantity of water discharged from the turbine supplied by the penstock, weakened a bursting plate, having a low factor of safety, to such a degree that it burst unexpectedly at a lower pressure than that which it was designed to sustain. That is, it burst under ordinary operating conditions with attending loss of service, and the expense and annoyance in replacing broken parts.

The principal object of my invention has been to provide a pressure-relief device which will overcome the objections above set forth, and one which will have a sufficient factor of safety to insure against bursting under ordinary conditions of service, but one which will give way at the predetermined excessive pressure, and thereby relieve the penstock of dangerous stresses which will be produced by the unrelieved pressure surge or water-hammer.

Another object has been to provide a pressure-relief device, having a plurality of bursting plates supplementing each other in closing an opening in a receptacle, the plates being so arranged that the fluid pressure in the receptacle is divided between them, one plate sustaining the pulsating pressure and the other plate sustaining a substantially constant pressure which is not materially in excess of the normal pressure until the predetermined bursting pressure has been reached.

Furthermore, I have sought to provide a device, which is simple and inexpensive to construct and maintain, and also one which is certain in its operation.

The above objects and advantages have been accomplished by the device shown in the accompanying drawings, of which:

Fig. 1 is a vertical, sectional view of my complete device.

Fig. 2 is a fragmentary view showing a modified means of securing the bursting plate in position.

Fig. 3 is a fragmentary view of another modified form of my invention.

In this specification, I will describe my invention as applied to a penstock supplying water to a turbine, it being obvious that the device is applicable to any receptacle carrying fluid under pressure.

In the drawings, 5 represents the nozzle or branch of a penstock having the usual flange 6. A ring 7, having an inwardly extending flange 8 and an outwardly extending flange 9, is secured to the flange 6 by means of a plurality of bolts 10. A stopper plate 11 is arranged within the ring 7 and is provided with an extension 12 and with a flange 13. The extension 12 is fitted into the inwardly extending flange 8 of the ring 7 so as to have sliding engagement therewith. The stopper plate 11 is held in position by means of a plurality of bolts 14, which pass through the flange 13 of the plate, and into the inwardly extending flange 8. Each of these bolts is provided with a flattened portion 15, whereby it may be screwed into and out of the flange 8 by means of a wrench. Each of the bolts is provided between the flattened portion 15 and the outward end with a reduced portion 16 of predetermined cross-section.

Arranged adjacent the ring 7 is a bursting plate 17. This plate is preferably provided with a flange 18, which is arranged adjacent and secured to the outwardly extending flange 9 of the ring 7 by means of a plurality of bolts 19. An equalizer ring 20 is preferably employed when high pressures are met, and this is arranged adjacent the flange 18, and is also held in place by the bolts 19. The bursting plate 17 is provided preferably on each side with an annular groove or score 21, so as to give to the plate a predetermined thickness at a point between the grooves, whereby it will have a predetermined bursting strength equal to the load imposed upon it by the predetermined bursting pressure. The grooves 21 are preferably larger in diameter than the flange 13 of the stopper plate 11, whereby the stopper plate 11 will be free to pass through the opening formed by the bursting plate 17 when it has been ruptured.

The stopper plate 11 is provided with an outwardly extending projection 22. This projection is carried at the center of the plate 11 and is, therefore, disposed opposite the center of the bursting plate 17, and has a small clearance space 23 between its outer end and the plate 17. The clearance 23 is preferably made just large enough to permit the bolts 14 to stretch and break before the projection 22 contacts with the plate 17.

An aperture 25 of restricted size extends through the inwardly extending flange 8 of the ring 7 and connects the interior of the branch 5 with the space 26 formed within the ring 7 between its inner flange 8 and the bursting plate 17. This aperture thus provides a passageway for a limited quantity of fluid to pass from the penstock to the space 26. An aperture 27 is provided in the ring 7, and secured therein is an automatic pressure relief valve 28. This valve is a standard article of commercial manufacture, and need not, therefore, be described in detail in this specification, except to state that it is of a type which will automatically discharge when a predetermined pressure is reached or exceeded. The relief valve preferably has sufficient discharge capacity to prevent the water, which enters the space 26 through the aperture 25 and by leakage around the extension 12 of the stopper plate 11, from exceeding the predetermined maximum pressure in the space. The maximum pressure in the space 14 is preferably substantially the normal fluid pressure in the penstock branch 5.

In the form of invention shown in Fig. 2, I show the use of bolts 30 for holding the bursting plate 31 in position. These bolts are preferably reduced at 32 so as to have a predetermined area. In this form, the bolts will break when the predetermined pressure is reached, instead of the plate as in the form above described.

The modification shown in Fig. 3 shows a stopper plate 33, which is secured to the flange 8 of the ring 7 by means of bolts 34 of uniform diameter. In this form, the stopper plate 33 is provided with a groove or score 35 preferably on each side thereof and in opposite arrangement, whereby the plate is given a predetermined bursting strength. In this form, the bursting plate 17 is the same as the bursting plate in the form shown in Fig. 1, and it is preferably held in position by means of solid bolts 19.

It will be clear from the foregoing that when the penstock branch 5 is filled with water, the water will flow through the aperture 25 into the space 26. Some water may also leak in at the joint between the extension 12 and the inwardly extending flange 8 of the ring 7, but this will flow into the space 26 and a limited amount of leakage at this point will not be detrimental. As the water flows into the space 26, its pressure will rise to a point not more than the pressure at which the relief valve 28 is set to discharge, which is a pressure preferably at substantially the normal pressure existing in the penstock branch 5. Under these conditions, as long as the bolts 14 remain intact, the water pressure within the space 26 will never exceed the predetermined pressure at which the valve 28 is set to discharge. By this arrangement, the bursting plate 17 is protected from pulsating pressures, and will be steadily loaded at not exceeding practically normal pressure until the predetermined bursting pressure is suddenly thrown upon it. When, however, the predetermined bursting pressure in the penstock 5 is reached, the bolts 14 will break and the stopper plate 11 will be forced toward the bursting plate 17 with the result that the load, carried by the bolts 14 and the stopper plate 11 will be suddenly imposed upon the bursting plate 17, causing it to burst, and opening the way for the ejection of the stopper plate 11, whereby the branch 5 will be opened, allowing an unobstructed discharge of water from the penstock, thus quickly relieving the excessive pressure therein.

It will be evident that when the bolts 14 break, the load sustained by them will be transferred to the bursting plate 17 in either or both of two ways; namely, hydraulically, and mechanically. It will be clear that any movement of the stopper plate 11 toward the bursting plate 17 will increase the fluid pressure within the space 26, unless the relief valve has a capacity sufficient to instantly discharge the water in volume equal to the displacement, and thus prevent its rising in pressure. However, if the fluid pressure in space 26 does rise, this rise in pressure will act upon the bursting plate 17, and such additional load will be equally distributed over the area of the plate 17. On the other hand, when the stopper plate 11 moves toward the bursting plate 17, and the projection 22 of the stopper plate contacts with the bursting plate, the load upon the stopper plate will be directed and concentrated upon the center of the bursting plate 17, except such part of the load as may be transferred hydraulically, as above explained. Since the extension 12 of the stopper plate 11 extends into the flange 8 a greater distance than the clearance space 23, it is clear that the load carried by the stopper plate will be mechanically transferred, through the projection 22 to the bursting plate 17 before the pressure within the penstock is transferred to the bursting plate.

Because of the construction above pointed out, my device has a greater factor of safety than if the bursting plate 17 were exposed to the surges occurring in the penstock since, as is well known, a given load when concentrated at the center of a plate requires that the plate be thicker and stronger than if the same load is distributed over the entire surface of the plate.

As hereinbefore pointed out, the factor of safety of my device is comparatively high. This may be clearly understood by assuming that; for instance, the normal pressure of the water in the penstock is 100; that under ordinary operating conditions, the water pressure frequently surges to 125; and that the bursting pressure of the device is 150. In such a case, the relief valve 28 is set to discharge when the pressure in the space 26 exceeds 100. As long as the penstock pressure is 100 or less, the pressure in the space 26 will be the same, being equalized by the discharge of the water through the aperture 25 in either direction. When the pressure in the penstock exceeds 100, the pressure in the space 26 tends to rise, as the water enters it through the aperture 25 and through the joint between the extension 12 and the flange 8. The pressure in the space 26 is, however, held at substantially 100 by discharge through the relief valve 28. The load thus imposed upon the bolts 14 is substantially equal to the area of the extension 12 multiplied by the difference of the unit pressures on the two sides of the stopper plate 11. The bolts are, therefore, proportioned at their reduced portion 16 to break when the difference between the pressures is 50; that is, 150—100, the bursting pressure being 150. It is, therefore, evident that when ordinary surges of 125 occur, which is 25 over normal, the bolts 14 have a factor of safety of 50 divided by 25; that is 2.

Since the projection 22 contacts with the center of the bursting plate 17 before the extension 12 leaves its place in the flange 8, the entire load imposed upon the stopper plate 11 is transferred mechanically to the plate 17 at its center. The bursting plate 17 may thus be made strong enough, as herein pointed out, to have a factor of safety of 2 or more depending upon the pressure surges. In other words, my device may be made strong enough so as to safely stand—with a factor of safety of 2 or more—the ordinary pressure surges of approximately 125 (assuming the normal pressure to be 100) with the assurance that it will operate when the predetermined pressure of 150 is reached. Comparing the factor of safety assured by my device with the ordinary single plate which is designed to burst at the same predetermined pressure of 150, it will be seen that the factor of safety in my device is much higher. Assuming the same pressures in the single plate design, this plate design would only have a factor of safety of 1.2 since 150 divided by the ordinary surge of 125 equals 1.2, while the factor of safety of my device, as above pointed out, is 2 or more. Aside from the advantages of my device, as just pointed out, the bursting plate 17 is steadily loaded while the bolts 14 holding the stopper plate 11 take all of the pressure of pulsations, in simple tension, ordinarily occurring at frequent intervals in a penstock. For this reason, the bolts 14 of my device will sustain such pulsations with greater reliability than will a plate in which the strains are more complex and more difficult to previously ascertain with accuracy.

It will be clear that a shut-off valve of any of the well known standard types may be inserted in the penstock to be used after the pressure-relief device has functioned, and thus permit the replacement of broken parts without emptying the entire penstock. While I have shown but one aperture for conducting fluid to the space 26, it is obvious that other apertures may be made through the flange 8, or one or more apertures may be made through the stopper plate 11. Furthermore, if desired, a number of pressure-relief valves may be employed so that if one should fail to function, another one would act. Moreover, the end of the extension 22 may be made pointed, if desired, and a cast-iron bursting plate may be made of reduced cross-section at its center so that it may be easily punctured by the extension. These and other modifications of the details herein shown and described may be made without departing from the spirit of my invention or the scope of the appended claims, and, therefore, I do not wish to be limited to the exact embodiment of the form herein shown and described, the form being merely a preferred embodiment thereof.

Having thus described my invention what I claim is:

1. The combination with a receptacle containing fluid under pressure, of a pressure-relief device characterized by having a bursting plate, a slidably mounted stopper plate disposed behind the bursting plate and formed with a piston portion and a central projection pointing toward the center of the bursting plate, one plate supplementing the other in retaining the fluid pressure in the receptacle until a predetermined pressure is reached, when both plates give way allowing a free passage for the discharge of fluid from the receptacle.

2. The combination with a receptacle, of a pressure-relief device characterized by having a bursting plate, a slidably mounted stopper plate formed with a piston portion and with a central projection pointing toward the center of the bursting plate, the bursting plate being exposed to the normal fluid pressure existing within the receptacle, and means for counterbalancing the fluid pressure within the receptacle on the stopper plate.

3. The combination with a receptacle of a pressure-relief device characterized by having a bursting plate of predetermined strength, exposed to the normal fluid pressure existing within the receptacle, a slidably mounted stopper plate of predetermined strength, the stopper plate being formed with a piston portion and a central projection pointing toward the center of the bursting plate, and means for counterbalancing the fluid pressure within the receptacle on the stopper plate.

4. The combination with a receptacle containing fluid under pressure, of a pressure-relief device characterized by having a bursting plate, a slidably mounted stopper plate in interspaced relation with the bursting plate, the stopper plate being formed with a piston portion and with a central projection pointing toward the bursting plate, a fluid passageway between the interior of the receptacle and the space between the plates, and means for controlling the fluid pressure in the space, whereby one plate will supplement the other plate in retaining the fluid.

5. The combination with a receptacle containing fluid under pressure, of a pressure-relief device characterized by having a bursting plate, a slidably mounted stopper plate disposed behind the bursting plate and having a central projection pointing toward the center of the bursting plate and in interspaced relation therewith, the plates supplementing each other in retaining the fluid pressure in the receptacle until a predetermined pressure is reached, whereby when the stopper plate gives way, the pressure in the receptacle is thrown upon the center of the bursting plate.

6. The combination with a receptacle containing fluid under pressure, of a pressure-relief device characterized by having a bursting plate, a slidably mounted stopper plate formed with a piston portion, a confined space between them, a fluid passageway between the interior of the receptacle and the space between the plates, each plate supplementing the other in retaining the fluid pressure in the receptacle, and means for controlling the fluid pressure in the space until a predetermined pressure in the receptacle is reached, whereby when the stopper plate gives way, the pressure in the receptacle is thrown upon the bursting plate.

7. The combination with a receptacle containing fluid under pressure, of a pressure-relief device characterized by having a bursting plate, a stopper plate arranged behind the bursting plate and slidably disposed in the receptacle, the stopper plate also having a central projection pointing toward the center of the bursting plate and in interspaced relation therewith, the plates supplementing each other in retaining the fluid pressure in the receptacle until a predetermined pressure is reached, whereby when the stopper plate gives way, the pressure in the receptacle is thrown upon the center of the bursting plate.

8. The combination with a receptacle containing fluid under pressure, the receptacle being formed with an emergency outlet opening, of a pressure-relief device characterized by having a bursting plate, a slidably mounted stopper plate formed with a piston portion which is mounted in the emergency opening, the stopper plate being relatively smaller than the bursting plate and disposed behind and in interspaced relation with the bursting plate, one plate supplementing the other in maintaining the fluid pressure in the receptacle until the predetermined pressure is reached, when one plate is burst and the other forced out of the emergency outlet opening.

9. The combination with a receptacle containing fluid under pressure, the receptacle being formed with an emergency outlet opening, of a pressure-relief device characterized by having a bursting plate, a slidably mounted stopper plate formed with a piston portion which is mounted in the emergency opening, the stopper plate being relatively smaller than the bursting plate and disposed behind and in interspaced relation with the bursting plate, the bursting plate being exposed to the normal fluid pressure existing within the receptacle, and means for counterbalancing the fluid pressure within the receptacle on the stopper plate.

10. The combination with a receptacle containing fluid under pressure, the receptacle being formed with an emergency outlet opening, of a pressure-relief device characterized by having a bursting plate of predetermined strength, a slidably mounted stopper plate formed with a piston portion which is mounted in the emergency opening, the stopper plate being relatively smaller than the bursting plate and disposed behind and in interspaced relation with the bursting plate, bolts of predetermined strength for holding the stopper plate in place, the bursting plate being exposed to the normal fluid pressure existing within the receptacle, and means for counterbalancing the fluid pressure within the receptacle on the stopper plate.

11. The combination with a receptacle containing fluid under pressure, the receptacle being formed with an emergency outlet opening, of a pressure-relief device characterized by having a bursting plate, a slidably mounted stopper plate formed with a piston portion mounted within the emergency opening and with a central projection pointing toward the center of the bursting plate, the stopper plate being relatively smaller than the bursting plate and disposed behind the bursting plate with its central projection in interspaced relation with the bursting plate, one plate supplementing the other in maintaining the fluid pressure in the receptacle until the predetermined pressure is reached when one plate is burst and the other plate is forced out of the emergency outlet opening.

12. The combination with a receptacle containing fluid under pressure, the receptacle being formed with an emergency outlet opening, of a pressure-relief device characterized by having a bursting plate, a slidably mounted stopper plate formed with a piston portion mounted with the emergency opening and with a central projection pointing toward the center of the bursting plate, the stopper plate being relatively smaller than the bursting plate and disposed behind the bursting plate with its central projection in interspaced relation with the bursting plate, the bursting plate being exposed to the normal fluid pressure existing within the receptacle, and means for counterbalancing the fluid pressure within the receptacle on the stopper plate.

In testimony whereof, I have hereunto signed my name.

CHARLES C. EGBERT.